United States Patent
Hsiong

(10) Patent No.: US 8,635,566 B2
(45) Date of Patent: Jan. 21, 2014

(54) PARITY ERROR DETECTION VERIFICATION

(75) Inventor: Christopher E. Hsiong, Sunnyvale, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 13/331,172

(22) Filed: Dec. 20, 2011

(65) Prior Publication Data

US 2013/0158973 A1 Jun. 20, 2013

(51) Int. Cl.
*G06F 17/50* (2006.01)

(52) U.S. Cl.
USPC .................. 716/106; 714/718; 714/741

(58) Field of Classification Search
None
See application file for complete search history.

(56) References Cited

U.S. PATENT DOCUMENTS

| | | | |
|---|---|---|---|
| 5,838,940 A * | 11/1998 | Savkar et al. | 712/216 |
| 5,872,790 A * | 2/1999 | Dixon | 714/703 |
| 7,366,829 B1 * | 4/2008 | Luttrell et al. | 711/108 |
| 7,383,492 B2 * | 6/2008 | Sailer et al. | 714/801 |
| 7,441,209 B2 * | 10/2008 | Roesner et al. | 716/103 |
| 7,590,826 B2 * | 9/2009 | Begon et al. | 712/216 |
| 8,024,632 B1 * | 9/2011 | Konrad | 714/733 |
| 2008/0082893 A1 * | 4/2008 | Wang | 714/758 |

* cited by examiner

*Primary Examiner* — Leigh Garbowski
(74) *Attorney, Agent, or Firm* — Abel Law Group, LLP

(57) ABSTRACT

A circuit design is simulated on a computing system. Simulating the circuit design includes selecting a first memory location in the circuit design in which to introduce a parity error according to the first memory location having a higher probability of being read than a second memory location of the circuit design. A parity error is inserted in the first memory location during simulation of the design.

18 Claims, 5 Drawing Sheets

PARITY ERROR DETECTION VERIFICATION

BACKGROUND

1. Field of the Invention

This disclosure relates to computing systems and more particularly to simulations of circuit designs using computing systems.

2. Description of the Related Art

Electronic devices continue to grow in complexity, spurred in part by the high performance and low cost of monolithic integrated circuits. As the number of components on an integrated circuit grows ever larger, designs become more intricate. Accordingly, integrated circuit designs are often subjected to numerous simulations and tests to ensure correct operation prior to fabrication. However, given the growing complexity of integrated circuits, such simulations and tests tend to consume significant time and resources, particularly since the penalty for a design error can be disastrous. Design verifications therefore occupy an appreciable portion of the design of an integrated circuit, and yet can still overlook design errors in the complex integrated circuits.

SUMMARY OF EMBODIMENTS OF THE INVENTION

In at least one embodiment, a method of simulating a circuit design on a computing system includes selecting a first memory location in the circuit design in which to introduce a parity error according to the first memory location having a higher probability of being read than a second memory location of the circuit design. The method further includes inserting the parity error in the first memory location during simulation of the circuit design.

In at least one embodiment, a non-transitory computer-readable storage medium encodes instructions executable by a computing system to cause the computing system to determine that a first memory location of a circuit design is associated with a higher probability of being read than a second memory location of the circuit design and to cause a parity error associated with the first memory location during simulation of the circuit design.

In at least one embodiment, a method of simulating a circuit design on a computing system includes, in response to a register of a register file being included in an architectural-to-physical register mapping of a simulation of the circuit design, introducing a parity error associated with the register in the simulation.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
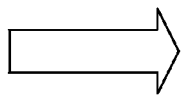
FIG. 1 is a block diagram of a design simulation according to at least one embodiment of the invention.

Referring to FIG. 1, a block diagram of a portion of an illustrative design simulation is depicted and generally designated 100. In at least one embodiment, design simulation 100 represents a portion of an integrated circuit being simulated. As shown in FIG. 1, array 104a includes a plurality of memory locations 112a (i.e., memory locations 0-7) each identified by a corresponding one of a plurality of indices 116a. Memory locations 2, 4, and 7 contain respective data entries (e.g., a sequence of one or more bits each having a logical value of one or zero). For example, memory location 2 contains data entry "11100100." In at least one embodiment of array 104a, the leftmost bit of each such data entry indicates a parity value associated with the data entry.

Parity can be used in integrated circuits to detect soft errors (e.g., data errors) at physical arrays and data structures. Such integrated circuits may include error detection circuitry that tests for parity errors indicative of soft errors. Because detection of such soft errors is an important consideration in the design of an integrated circuit, error detection circuitry should be verified in a simulation along with other components of the integrated circuit under test to help ensure proper operation.

To illustrate, memory location 7 includes an example data entry of "01010110." In at least one embodiment, memory location 7 is parity-protected according to an even parity scheme. For example, because the data entry at memory location 7 contains an even number of "1" bits, the leftmost bit of the data entry (e.g., a parity bit) associated with memory location 7 may be set to "0," as shown in FIG. 1. However, FIG. 1 is illustrative and other error verification schemes can be implemented (e.g., an odd parity check, a cyclic redundancy check (CRC), and other appropriate techniques).

In the example of FIG. 1, data entries of memory locations 0-7 of array 104a are read out to error detection logic 108. Error detection logic 108 performs logic operations on the data entries to determine if each parity bit correctly corresponds to the associated data entry (e.g., by using logic to calculate an XOR sum of the bits of each data entry). For example, if an even parity scheme is used in design simulation 100, then error detection logic should determine that memory location 7 is correctly parity protected (i.e., that memory location 7 includes an even number of "1" bits). In this example, if the data entry at memory location 7 is read out to error detection logic 108 (e.g., via a bus) and error detection logic 108 determines that a parity error is associated with memory location 7, then error detection logic 108 may contain a design error (i.e., does not operate according to a desired design specification).

Further, suppose memory location 7 in the foregoing even parity example was incorrectly parity protected by a "1" parity bit. If error detection logic does not indicate a parity error associated with the data entry stored at memory location 7, then error detection logic may contain a design error. Such design errors in error detection logic 108, if uncorrected, could severely degrade performance of the integrated circuit under test.

Accordingly, to properly verify operation of error detection logic 108, parity errors may be introduced at memory locations of the integrated circuit under test to determine whether error detection logic 108 correctly verifies the errors. The process of injecting parity errors into a memory location by altering one or more bit values is also referred to herein as "irritation," and the altered bit values are referred to herein as "irritated."

One example irritation process is a random irritation where parity errors are introduced randomly into memory locations of arrays (e.g., memory locations 1-7 of array 104*a*). For example, an array of design simulation 100 could be picked at random, and a memory location of the array could be selected at random to be irritated. However, such a process can be inefficient as the irritated entry may not be read out during simulation, thus providing no additional useful information regarding operation of error detection logic 108.

To increase the probability of the randomly selected memory location being read out, more simulations and more cycles per simulation can be performed, so as to improve error detection coverage. Such irritation processes may test parity error detection over billions of cycles and hundreds of thousands of regression simulations and yet still detect only a relatively low percentage of parity errors. Further, even if the randomly selected memory location will eventually be read, the data entry might be flushed away or overwritten along with the parity error prior to the memory location being read.

Another example of an irritation process is to irritate each entry in the array, and not just a single entry, in order to increase the probability of reading out an irritated memory location. However, irritating all such entries may not represent "real-world" operation of the integrated circuit under test, since the probability of all entries of an array of an integrated circuit having parity errors is low. Further, because this irritation process generally does not correspond to actual operation of the integrated circuit, design micro-architecture may not support multiple entry irritation, which may yield unpredictable behavior and false errors.

Yet another example of an irritation process is to irritate an output bus that reads out data from the array (e.g., to error detection logic 108). While such an irritation may generally guarantee that irritated memory locations are read out, it does not correspond to actual operation of the final fabricated integrated circuit, since, for example, parity errors can remain dormant in arrays for some time before being read out. Further, such an irritation also does not test cases where a parity error is overwritten by subsequent writes to the array, which can be an important scenario in the fabricated integrated circuit that should be simulated.

Accordingly, in at least one embodiment, an irritation process irritates memory locations having a high probability of being read out soon relative to other memory locations. Further, in at least one embodiment, such an irritation process tests cases that correspond to "real-world" operation of the integrated circuit under test.

As shown in FIG. 1, memory location 4 of array 104*a* is determined to have a higher probability of being read out during simulation relative to other memory locations of array 104*a*. Accordingly, a parity error is introduced at memory location 4, namely by altering the value of the parity bit associated with the data entry stored at memory location 4, yielding array 104*b*. Parity errors can be caused by using appropriate instructions executed on a computing system. Because memory location 4 has a higher probability of being read out relative to other memory locations of array 104*b* during simulation, it may be more likely that error detection logic 108 performs a parity check operation on the data entry prior to the data entry being overwritten. As shown in FIG. 1, the data entry stored at memory array 104*b* is read out to error detection logic 108, which correctly determines that the data entry contains a parity error. Design simulation 100 can continue by causing additional errors at array 104*a* or at another array, etc.

While the example of FIG. 1 illustrates that the parity bit associated with the data entry stored at memory location 4 is altered, it should be appreciated that other bits can be altered to introduce a parity error (e.g., a different bit of the data entry stored at memory location 4, or a parity bit stored at a data structure distinct from memory location 4). Further, parity bits need not be stored at a leftmost position as indicated in FIG. 1. Various techniques for determining memory locations having a high relative probability of being read are described below. Selection of an appropriate technique can depend on the structural nature of the array itself, the circuit being tested, and other factors as appropriate.

Figure 2:
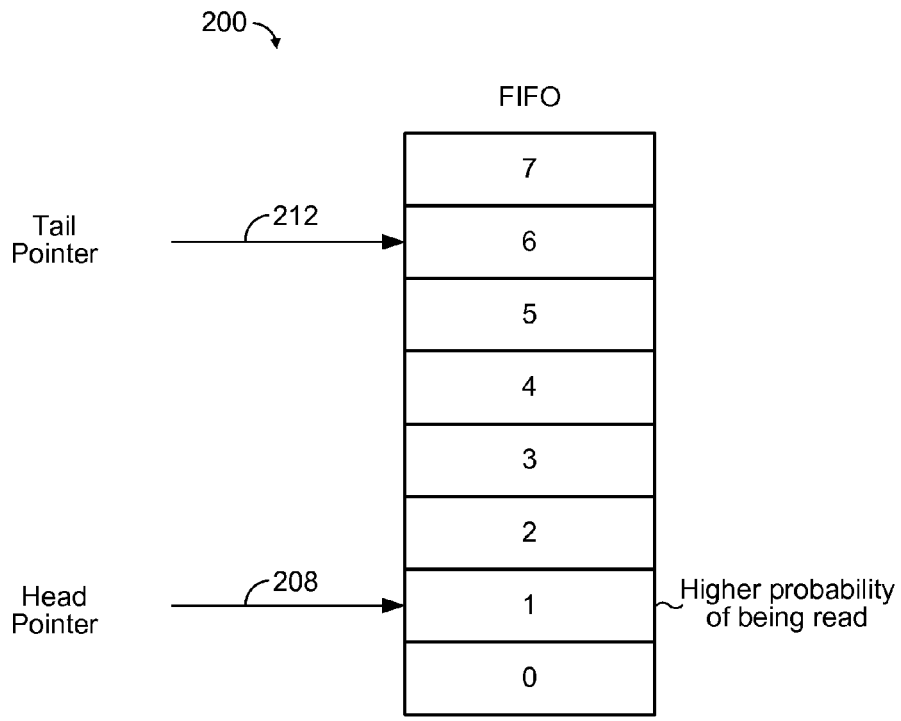
FIG. 2 is a block diagram of a design simulation according to at least one embodiment of the invention.

Referring to FIG. 2, a block diagram of an illustrative first-in first-out (FIFO) buffer of a design simulation is depicted and generally designated 200. For ease of illustration, data entries as described with reference to FIG. 1 are omitted from FIGS. 2-5, but indices (e.g., 0-7) are depicted.

As shown in FIG. 2, FIFO buffer 200 includes 8 memory locations (i.e., memory locations 0-7). FIFO buffer 200 further includes head pointer 208 and tail pointer 212. Head pointer 208 may point to (i.e., indicate) a next memory location of FIFO buffer 200 to be read from. As illustrated in FIG. 2, head pointer 208 currently points to memory location 1 of FIFO buffer 200. Tail pointer 212 may point to a next memory location of FIFO buffer 200 to be written to. As illustrated in FIG. 2, tail pointer 212 currently points to memory location 6 of FIFO buffer 200.

In at least one embodiment of FIFO buffer 200, the memory location indicated by head pointer 208 (i.e., memory location 1 in FIG. 2) is determined to be a memory location having the highest probability of being read out during simulation than other memory locations of FIFO buffer 200. Accordingly, a parity error may be introduced at memory location 1. In at least one embodiment, FIFO buffer 200 is an in-order FIFO buffer, where a memory location to be read after next (i.e., memory location 2 in FIG. 2) may also be irritated if one or more additional parity errors are to be introduced. In at least one embodiment, data at the memory location indicated by tail pointer 212 is determined to be the least likely to be read next, since the memory location indicated by tail pointer 212 is to be written to next. Determinations as to memory locations more and less likely to be read can be made by a computing device, as described further with reference to FIG. 6.

Figure 3:
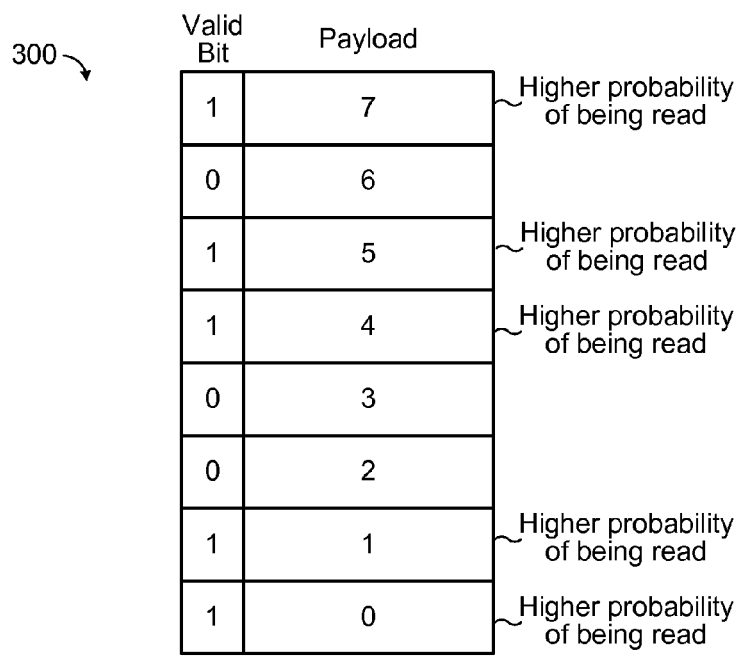
FIG. 3 is a block diagram of a design simulation according to at least one embodiment of the invention.

Referring to FIG. 3, a block diagram of an illustrative buffer of a design simulation is depicted and generally designated 300. In at least one embodiment, buffer 300 is an out-of-order buffer (e.g., a buffer where stored instructions can be allocated/de-allocated in any order) that includes memory locations 0-7, each having a corresponding valid bit indicating whether the associated payload is valid. For example, in at least one embodiment, a memory location allocated by an in-flight operation is indicated as being valid and is subsequently indicated as being invalid once the operation has completed and the memory location has been de-allocated. Valid bits associated with buffer 300 can be included in data structures of buffer 300 or can be included in a separate bit vector that is distinct from buffer 300.

A determination may be made (e.g., by a computing system) that memory locations indicated to be valid are more likely to be read. For example, suppose that for buffer 300 of FIG. 3 a "1" logic value of a valid bit indicates a valid entry (i.e., memory locations 0, 1, 4, 5, and 7 of FIG. 3) and a "0"

logic value of a valid bit indicates an invalid entry (i.e., memory locations 2, 3, and 6 of FIG. 3). In this example, a determination may be made that memory locations 0, 1, 4, 5, and 7 have a higher probability of being read then memory locations 2, 3, and 6, since memory locations 2, 3, and 6 do not contain valid payloads. Accordingly, one or more parity errors may be injected (e.g., by a computing system) at memory locations 0, 1, 4, 5, and 7.

Figure 4:
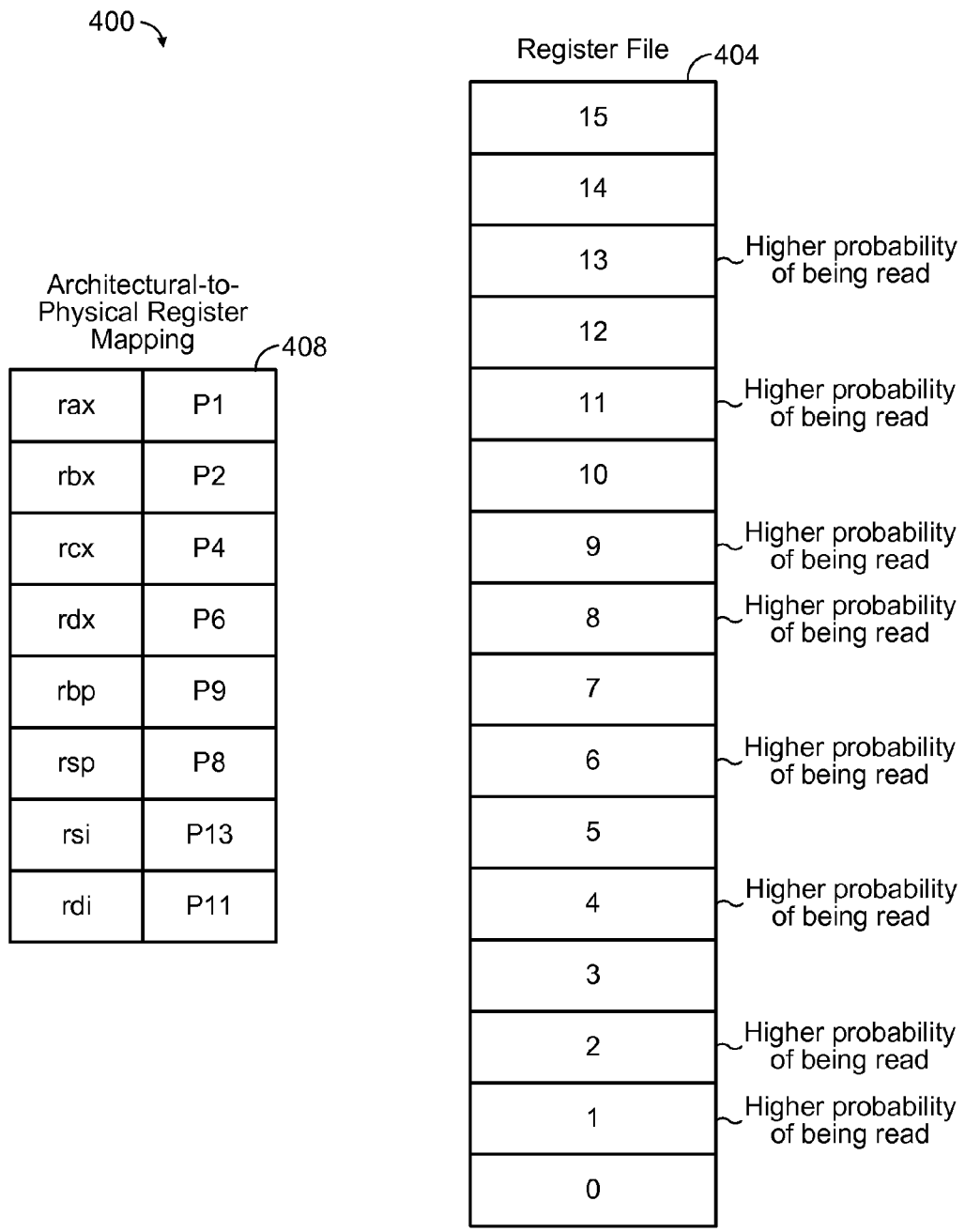
FIG. 4 is a block diagram of a design simulation according to at least one embodiment of the invention.

Referring to FIG. 4, a block diagram of an illustrative register file 404 and architectural-to-physical register mapping table 408 of a design simulation is depicted and generally designated 400. In at least one embodiment, architectural-to-physical register mapping table 408 indicates correspondence between architectural addresses, such as a set of registers associated with an instruction set architecture (ISA), and physical registers of register file 404 of the design simulation.

As shown in FIG. 4, architectural-to-physical register mapping table 408 indicates correspondence of architectural registers rax, rbx, rcx, rdx, rbp, rsp, rsi, and rdi to physical registers 1, 2, 4, 6, 9, 8, 13, and 11 of register file 404, respectively. Because executing applications may utilize architectural-to-physical register mapping table 408 to determine source physical registers of register file 404, a determination may be made that registers 1, 2, 4, 6, 9, 8, 13, and 11 of register file 404 have a higher probability of being read than registers 0, 3, 5, 7, 10, 12, 14, and 15 of register file 404. Accordingly, one or more parity errors may be injected (e.g., by a computing system) at registers 1, 2, 4, 6, 9, 8, 13, and 11 of register file 404.

Figure 5:
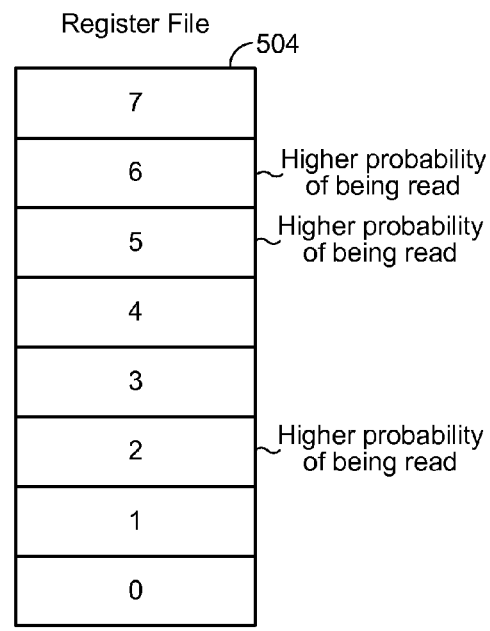
FIG. 5 is a block diagram of a design simulation according to at least one embodiment of the invention.

Referring to FIG. 5, a block diagram of an illustrative register file 504 and free list 508 of a design simulation is depicted and generally designated 500. In at least one embodiment, free list 508 indicates those registers of register file 504 that have not been written to or are obsolete and unused, and so will not be read out.

As shown in FIG. 5, free list 508 indicates that registers 0, 1, 3, 4, and 7 of register file 504 have not been written to or are obsolete and unused, and so will not be read out. Parity errors associated with registers 0, 1, 3, 4, and 7 of register file 504 might therefore not be read out or might be overwritten with data prior to being read out to error detection logic. Accordingly, a determination may be made that registers 0, 1, 3, 4, and 7 of register file 504 have a lower probability of being read than registers 2, 5, and 6 of register file 504 (or that registers 2, 5, and 6 of register file 504 have a higher probability of being read than registers 0, 1, 3, 4, and 7 of register file 504). Accordingly, one or more parity errors may be injected (e.g., by a computing system) at registers 2, 5, and 6 of register file 504.

Figure 6:
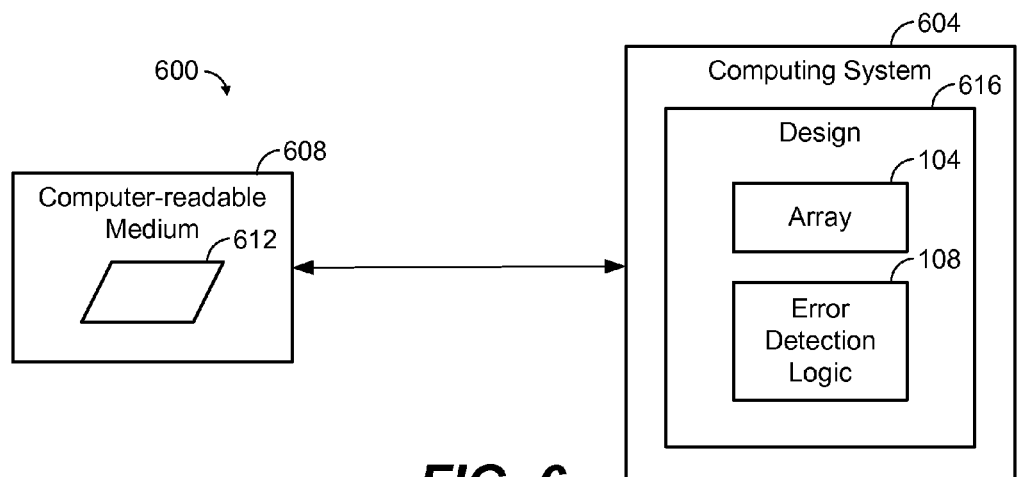
FIG. 6 is a block diagram of a system according to at least one embodiment of the invention.

Referring to FIG. 6, a particular illustrative embodiment of a system is depicted and generally designated 600. In at least the embodiment depicted in FIG. 6, computing system 604 simulates design 616 to verify design 616, which may correspond to an integrated circuit. Design 616 may include array 104 and error detection logic, each of which is also being simulated by computing system 604. Design 616 may be represented in suitable hardware description language (HDL), such as Verilog or VHSIC hardware description language (VHDL), which provides a register transfer level (RTL) description for design and verification of digital logic. Computing system 604 may include a test bench, servers, and other equipment and hardware suitable for simulating and verifying the operation of design 616. Computing system 604 may include input and output devices for user interface, such as a monitor, etc.

Computer-readable storage medium 608 may encode instructions 612. In at least one embodiment, instructions 612 are executable by computing system 604 to determine that a first memory location of a design (e.g., design 616) is associated with a higher probability of being read than a second memory location of the design, and to cause a parity error associated with the first memory location. In addition, instructions 612 may be executable by computing system 604 to cause computing system 604 to perform other operations and functions described herein with reference to FIGS. 1-7. In at least one embodiment, computer-readable storage medium 608 is a tangible (i.e., non-transitory) computer-readable storage medium. Computer-readable storage medium 608 may interface with computing system 604 using appropriate techniques and structures, such as a local area network (LAN), a universal serial bus (USB), and the like.

Figure 7:
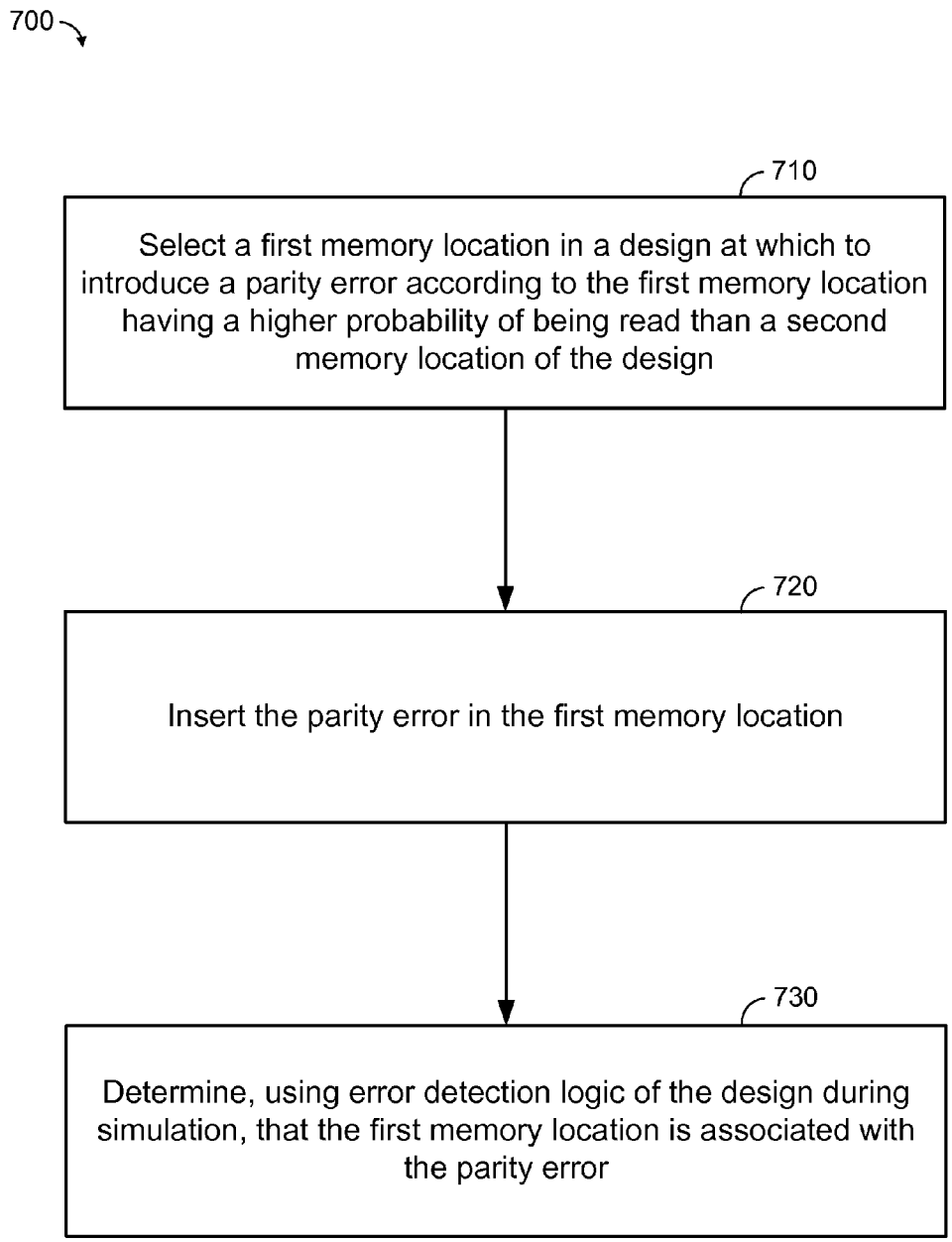
FIG. 7 is a flow diagram illustrating an exemplary operation according to at least one embodiment of the invention.

Referring to FIG. 7, flow diagram 700 illustrates an exemplary operation of simulating a design on a computing system. At 710, a first memory location in a design is selected in which to introduce a parity error according to the first memory location having a higher probability of being read than a second memory location of the design. The first memory location can be selected according to the various techniques and embodiments disclosed herein in connection with FIGS. 1-6. The first memory location and the second memory location can be located at the same array, memory, etc., of the design or the first memory location and the second memory location can be located at different arrays, memories, etc., of the design.

At 720, the parity error is inserted in the first memory location. For example, as described with reference to FIG. 1, a data entry of a memory location of an array may include a parity bit. It should further be appreciated that a parity bit can be represented in a data structure distinct from the array to which the parity bit corresponds.

At 730, a determination is made, using error detection logic of the design during simulation, that the first memory location is associated with the parity error. For example, the determination may be made by error detection logic 108 of FIG. 1. The determination that the first memory location is associated with the parity error can be used by the computing system in determining whether such error detection logic operates according to a design specification or whether such error detection logic contains one or more design errors.

Structures described herein may be implemented using instructions executing on a processor (e.g., one or more processors included in computing system 604), computer hardware, or by a combination of instructions and hardware. Such instructions may be encoded in at least one tangible (i.e., non-transitory) computer-readable storage medium that can be used (e.g., read) by a computing system. As referred to herein, a tangible computer-readable storage medium includes at least a disk, tape, or other magnetic, optical, or electronic storage medium. The computer-readable storage media may include one or more mechanisms to store data and/or instructions in a form accessible by a machine such as a microprocessor or, more generally, a computing system. A computer-readable storage medium may include volatile and/or non-volatile memory, such as read only memory (ROM), random access memory (RAM), magnetic disk storage media, optical storage media, flash memory devices, tape, or other magnetic, optical or electronic storage media. Such stored instructions can be used to cause a general or special purpose processor, programmed with the instructions, to perform one or more operations described herein (e.g., the exemplary operation described with reference to FIG. 7). In addition, the computer-readable storage media may store data as well as instructions.

Further, structures described herein may be embodied in computer-readable descriptive form suitable for use in design and simulation. Various embodiments are contemplated to include circuits, systems of circuits, related methods, and one or more tangible computer-readable media having encodings thereon (e.g., VHDL or Verilog) of such circuits, systems, and methods, all as described herein, and as defined in the appended claims.

The description of the invention set forth herein is illustrative, and is not intended to limit the scope of the invention as set forth in the following claims. For example, structures presented as discrete components in the exemplary embodiments may be implemented as a combined structure or component, and vice versa. Variations and modifications of the embodiments disclosed herein may be made based on the description set forth herein, without departing from the scope and spirit of the invention as set forth in the following claims.

What is claimed is:

1. A method of simulating a circuit design on a computing system comprising:
    selecting a first memory location in a software representation of the circuit design in which to introduce a parity error according to the first memory location having a higher probability of being read than a second memory location of the circuit design;
    inserting the parity error in the first memory location in the software representation; and
    simulating on the computing system the software representation of the circuit design with the parity error inserted.

2. The method as recited in claim 1 wherein the simulating further comprises: simulating that the error detection logic of the circuit design determines that the first memory location is associated with the parity error.

3. The method as recited in claim 1 wherein the circuit design is represented in hardware description language (HDL).

4. The method as recited in claim 1 wherein the first memory location is in a first-in first-out (FIFO) buffer, and the first memory location is selected according to a head pointer of the FIFO buffer indicating the first memory location as next to be read from the FIFO buffer.

5. The method as recited in claim 4 wherein the FIFO buffer is an in-order FIFO buffer, the method further comprising introducing a parity error into a third memory location of the FIFO buffer, wherein the third memory location is adjacent to the first memory location.

6. The method as recited in claim 1 wherein the first memory location is part of an array of memory locations each associated with a corresponding valid bit, and wherein the first memory location is selected based on being one of the memory locations of the array indicated to be valid by the corresponding valid bit.

7. The method as recited in claim 6 wherein the second memory location is one of the memory locations of the array indicated to be invalid by another of the valid bits.

8. The method as recited in claim 1 wherein the first memory location is a register of a register file, and wherein the circuit design further includes a list indicating registers of the register file, the first memory location being selected based on not being indicated by the list.

9. The method as recited in claim 8 wherein the list indicates those registers of the register file that have not been written to or are obsolete and unused.

10. The method as recited in claim 8 wherein the second memory location is a register of the register file and is indicated by the list.

11. The method as recited in claim 1 wherein the first memory location is a register of a register file, the register associated with a corresponding architectural register.

12. A non-transitory computer-readable storage medium encoding instructions executable by a computing system to cause the computing system to:
    determine that a first memory location of a circuit design is associated with a higher probability of being read than a second memory location of the circuit design; and
    cause a parity error associated with the first memory location during simulation of the circuit design.

13. The non-transitory computer-readable storage medium as recited in claim 12 wherein the circuit design is represented in hardware description language (HDL).

14. The non-transitory computer-readable storage medium as recited in claim 12 wherein the circuit design includes error detection logic to perform a parity check on data associated with the first memory location.

15. The non-transitory computer-readable storage medium as recited in claim 12 wherein the circuit design includes a first-in first-out (FIFO) buffer that includes the first memory location, and wherein a head pointer of the FIFO buffer indicates the first memory location as next to be read from the FIFO buffer.

16. The non-transitory computer-readable storage medium as recited in claim 12 wherein the circuit design includes an array of memory locations each associated with a corresponding valid bit, and wherein the first memory location is one of the memory locations of the array indicated to be valid.

17. The non-transitory computer-readable storage medium as recited in claim 12 wherein the circuit design includes a register file, wherein the second memory location is a register of the register file, and wherein the circuit design further includes a list indicating registers of the register file that have not been written to or are obsolete and unused, the second memory location indicated by the list.

18. The non-transitory computer-readable storage medium as recited in claim 12 wherein the circuit design includes a register file including the first memory location, and wherein the first memory location is a physical register of the register file, the physical register associated with a corresponding architectural register.

* * * * *